(12) United States Patent
Chen et al.

(10) Patent No.: US 7,117,563 B2
(45) Date of Patent: Oct. 10, 2006

(54) HINGE ASSEMBLY FOR FOLDABLE ELECTRONIC DEVICE

(75) Inventors: Rui-Hao Chen, Shenzhen (CN); Chao Duan, Shenzhen (CN); Jiang-Yuan He, Shenzhen (CN); Chia-Hua Chen, Tu-cheng (TW)

(73) Assignees: Shenzhen FuTaiHong Precision Industrial Co., Ltd., Shenzhen (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 10/904,797

(22) Filed: Nov. 30, 2004

(65) Prior Publication Data

US 2005/0172454 A1  Aug. 11, 2005

(30) Foreign Application Priority Data

Feb. 6, 2004  (TW) .............................. 93201654 U

(51) Int. Cl.
*E05D 11/10*  (2006.01)
(52) U.S. Cl. .............................. 16/330; 16/303; 16/340
(58) Field of Classification Search .................. 16/303, 16/330, 284, 367, 336, 327, 328, 321, 335, 16/338, 340, 241, 246, 342, 2.1, 273; 455/575.3, 455/433.11–433.12; 379/433.13; 361/683; 397/434
See application file for complete search history.

(56) References Cited

U.S. PATENT DOCUMENTS

| | | | |
|---|---|---|---|
| 6,101,676 A | * | 8/2000 | Wahl et al. .................... 16/342 |
| 6,175,990 B1 | | 1/2001 | Kato et al. |
| 6,871,383 B1 | * | 3/2005 | Huang .......................... 16/295 |
| 2002/0144378 A1 | * | 10/2002 | Liao ............................ 16/342 |
| 2003/0014840 A1 | * | 1/2003 | Huong ......................... 16/330 |
| 2003/0172494 A1 | * | 9/2003 | Oshima et al. ............... 16/285 |
| 2004/0128795 A1 | * | 7/2004 | Lu et al. ....................... 16/342 |

FOREIGN PATENT DOCUMENTS

JP  2003065320 A  *  3/2003

* cited by examiner

*Primary Examiner*—Chuck Y. Mah
*Assistant Examiner*—Mark T. Vogelbacker
(74) *Attorney, Agent, or Firm*—Morris Manning & Martin LLP; Tim Tingkang Xia, Esq.

(57) ABSTRACT

A hinge assembly includes a body drive member (1), a cover drive member (2), and a locating member (3). The body drive member has an outer screw thread (16) on an outer periphery thereof. The cover drive member has a central cavity (212, 224), and a projection (223) and an inner screw thread (216) formed in the cavity. The locating member has a projection (31) formed on an outer periphery thereof, and a central hole (33). The body drive member extends through the cavity and the hole, thereby integrating the hinge assembly into a complete unit, with the thread of the body drive member engaging with the thread of the cover drive member, and the projection of the cover drive member movably engaging with the projection of the locating member. The hinge assembly exerts reduced force on a foldable electronic device when the foldable electronic device is opened or closed.

20 Claims, 5 Drawing Sheets

HINGE ASSEMBLY FOR FOLDABLE ELECTRONIC DEVICE

FIELD OF THE INVENTION

The present invention relates to hinge assemblies, and particularly to a hinge assembly for foldable electronic devices such as mobile telephones, electronic notebooks, and so on.

DESCRIPTION OF RELATED ART

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly favored by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body.

U.S. Pat. No. 6,175,990 issued on Jan. 23, 2001 provides a hinge assembly used in a small-size foldable electronic device such as a portable telephone, a portable computer, an electronic notebook or the like. As represented in FIG. 8, the hinge assembly includes a shaft 10 provided with a discoid head 102 a first end portion thereof, a fixing member 20, a fixed cam 30, a rotary sliding cam 40, and a compression spring 50. An opposite second end portion of the shaft 10 is extended through the fixed cam 30, the rotary sliding cam 40, the compression spring 50 and the fixing member 20 in that order, thereby integrating the hinge assembly into a complete unit.

The fixed cam 30 abuts the head 102 of the shaft 10, and is rotatable relative to the shaft 10. A pair of opposite recessed cam portions 302 is defined on an end face of the fixed cam 30. A pair of opposite projection portions 402 is formed on an end face of the rotary sliding cam 40, corresponding to the cam portions 302. With the engagement of the cam portions 302 and the projection portions 402, the fixed cam 30 and the rotary sliding cam 40 are axially movable relative to each other and rotatable relative to each other. The rotary sliding cam 40 is axially movable relative to the shaft 10, and rotatable with the shaft 10. The fixing member 20 is secured around the second end portion of the shaft 10. The compression spring 50 is elastically engaged around the shaft 10 between the rotary sliding cam 40 and the fixing member 20, and continually presses the rotary sliding cam 40 against the fixed cam 30.

When the projection portions 402 of the rotary sliding cam 40 are engaged with the cam portions 302 of the fixed cam 30, the foldable electronic device is closed. When the foldable electronic device is opened, the projection portions 402 move out from engagement with the cam portions 302 onto coplanar end faces of the fixed cam 30. Once the foldable electronic device is opened to an angle of about 160°, the projection portions 402 snappingly engage into the corresponding cam portions 302 and are locked therein. However, during the process of the foldable electronic device being opened, a body and a cover of the foldable electronic device are directly subjected to force produced by the fixed cam 30, the rotary sliding cam 40 and the compression spring 50. This force is liable to cause damage to the body and the cover.

In view of the above-described shortcomings, a new, safer and more durable hinge assembly is desired.

SUMMARY OF INVENTION

An object of the present invention is to provide a hinge assembly which can reduce the force it exerts on a foldable electronic device when the foldable electronic device is opened or closed.

A hinge assembly according to the present invention includes a body drive member, a cover drive member, and a locating member. The body drive member has an outer screw thread on an outer periphery thereof. The cover drive member has a central cavity, and a projection and an inner screw thread formed in the cavity. The locating member has a projection formed on an outer periphery thereof, and a central hole. The body drive member extends through the cavity of the cover drive member and the hole of the locating member, thereby integrating the hinge assembly into a complete unit, with the outer screw thread of the body drive member threadingly engaging with the inner screw thread of the cover drive member, and the projection of the cover drive member movably engaging with the projection of the locating member.

Other objects, advantages and novel features of the invention will become more apparent from the following detailed description when taken in conjunction with the accompanying drawings, in which:

DETAILED DESCRIPTION

Figure 1:
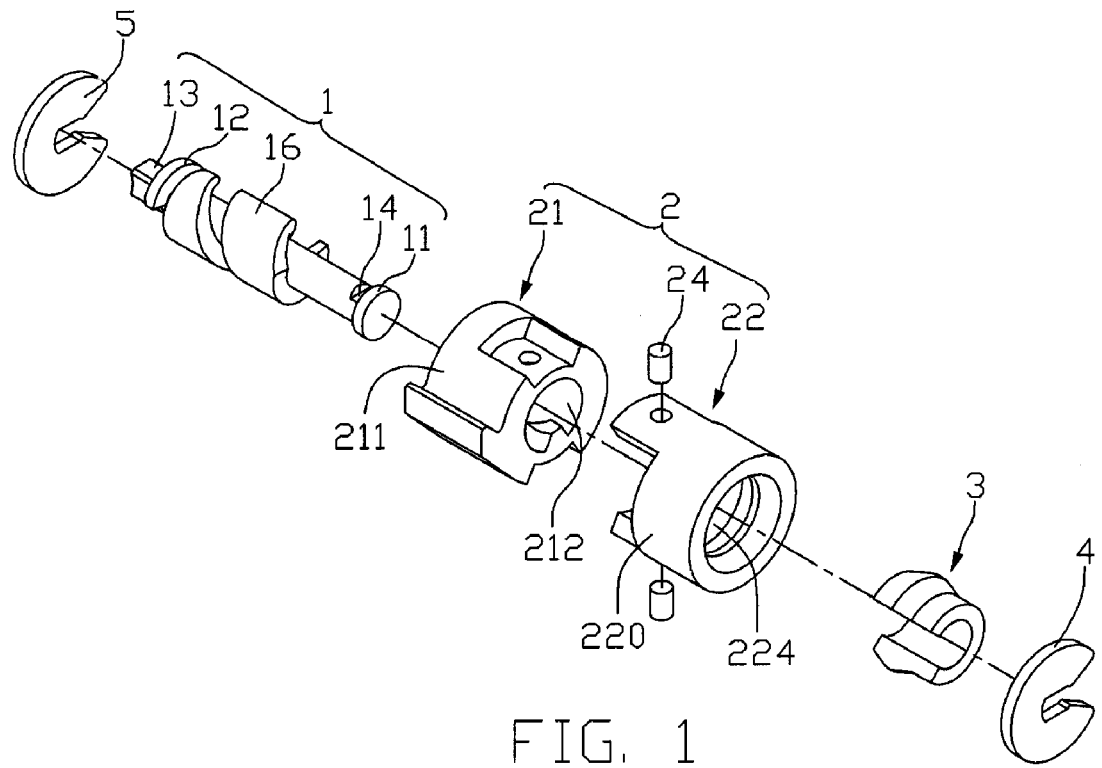
FIG. 1 is an exploded, isometric view of a hinge assembly according to a preferred embodiment of the present invention, the hinge assembly including a locating member.
Figure 2:
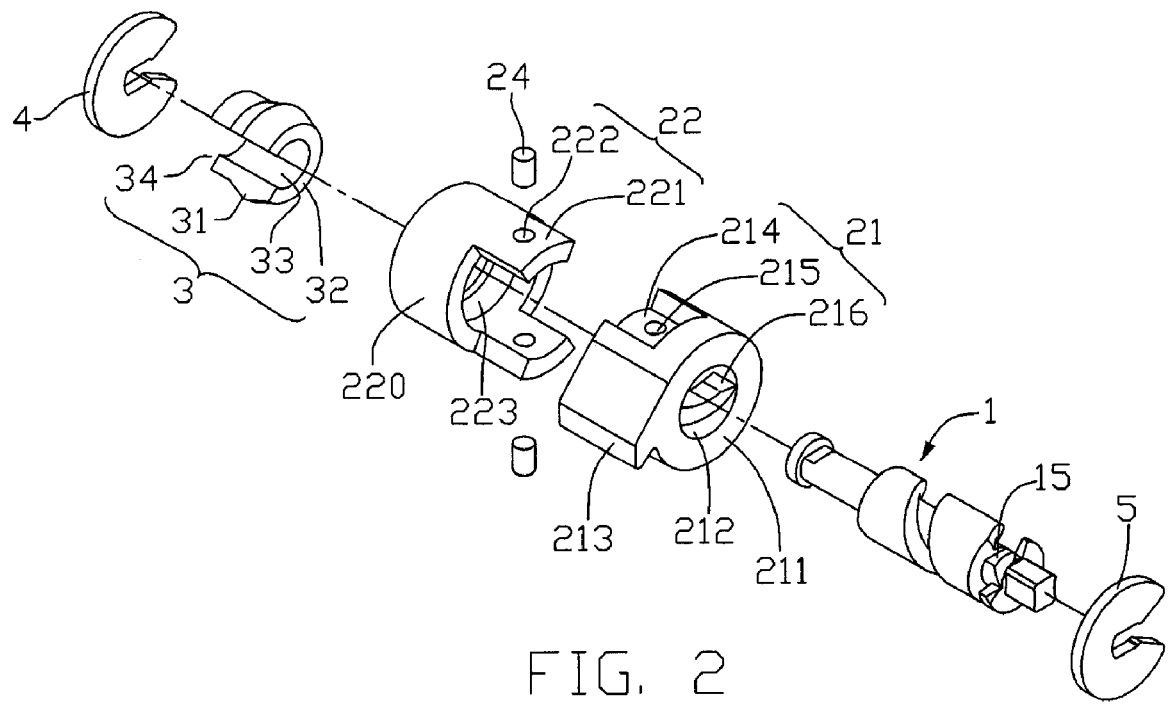
FIG. 2 is similar to FIG. 1, but viewed from a reverse aspect.
Figure 3:
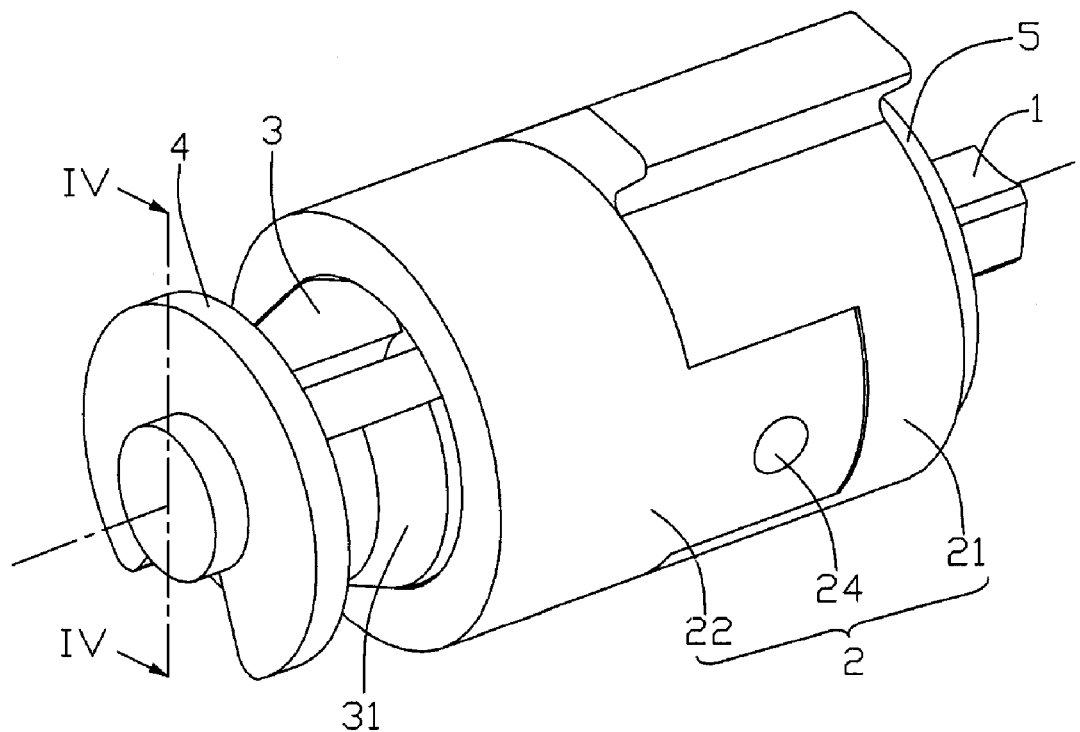
FIG. 3 is an enlarged, assembled view of the hinge assembly of FIG. 2, but viewed from another aspect, and showing the hinge assembly positioned corresponding to a closed position of a foldable electronic device.

FIG. 3 shows a hinge assembly according to the preferred embodiment of the present invention, which is used to interconnect components, like a body (not shown) and a cover (not shown), of a foldable electronic device. Also referring to FIGS. 1 and 2, the hinge assembly includes a body drive member 1, a cover drive member 2, a locating member 3 and disks 4, 5. The body drive member 1 extends through the cover drive member 2, the locating member 3 and the disks 4, 5, thereby integrating the hinge assembly into a complete unit.

The body drive member 1 is a shaft essentially in the form of a round rod. A discoid head 11 is formed at a first end of the body drive member 1, and a lock member 13 is formed at an opposite second end of the body drive member 1. The lock member 13 is substantially cuboid, and is engaged with the body of the foldable electronic device so that the body drive member 1 is rotatable with the body. A shield 12 is formed immediately next to the lock member 13. A pair of slots 14, 15 is defined in the body drive member 1, adjacent the head 11 and adjacent the shield 12 respectively. An outer screw thread 16 is formed on an outer periphery of the body drive member 1 adjacent the slot 15.

The cover drive member 2 includes a first tubular portion 21, a second tubular portion 22, and a pair of pins 24. The two tubular portions 21, 22 are each in the form of a hollow cylinder, and have a same outer diameter. The pins 24 fix the two tubular portions 21, 22 together.

The first tubular portion 21 has a tubular body 211 and a central cavity 212. A projection 213 extends from a circumferential periphery of the body 211. The projection 213 is engaged with the cover of the foldable electronic device, so that the first tubular portion 21 and hence the cover drive member 2 are rotatable with the cover. A pair of grooves 214 is defined in the circumferential periphery of the body 211. The grooves 214 are diametrically opposite from each other. A pinhole 215 is defined through the body 211 below each groove 214, and in communication with the groove 214. An inner screw thread 216 is formed on an inside wall of the body 211. The inner screw thread 216 is engaged with the outer screw thread 16 of the body drive member 1, so that the first tubular portion 21 and hence the cover drive member 2 can pivot relative to the body drive member 1.

Figure 4:
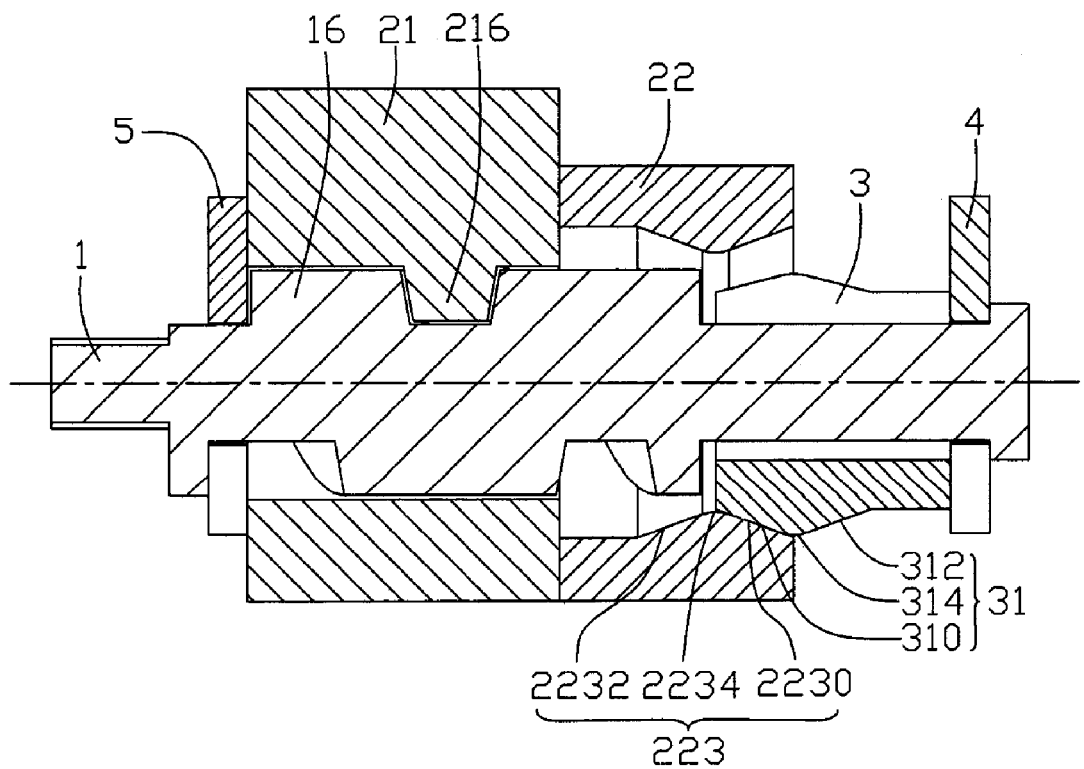
FIG. 4 is a cross-sectional view taken along line IV—IV of FIG. 3.

The second tubular portion 22 has a tubular body 220 and a central chamber 224. A pair of symmetrically opposite arcuate protrusions 221 extends from an end of the body 220. Each of the protrusions 221 has a pinhole 222 radially defined therethrough. The protrusions 221 are adapted to be received in the grooves 214 of the first tubular portion 21, with the pinholes 222 aligning with the pinholes 215 of the first tubular portion 21 so that the pins 24 can be secured in the pinholes 215, 222. An annular projection 223 is formed on an inner wall of an opposite end of the body 220. The projection 223 has two slopes 2230, 2232 at opposite sides of a ridge 2234, as shown in FIG. 4.

The locating member 3 is made of an elastic material, and has a generally cylindrical body 32 and a central hole 33. A cutout 34 is axially defined through the body 32 in communication with the hole 33. A generally annular projection 31 is formed on a circumferential periphery of the body 32. The projection 31 has two slopes 310, 312 at opposite sides of a ridge 314, as shown in FIG. 4.

The disks 4, 5 are made of a resin such as nylon. Each of the disks 4, 5 defines a generally Y-shaped notch (not labeled). This enables the disks 4, 5 to be snappingly secured on the body drive member 1 at the slots 14, 15 respectively.

In assembly of the hinge assembly, the disk 5 is secured on the second end of the body drive member 1 at the slot 15. The first end of the body drive member 1 is rotated into the cavity 212 of the first tubular portion 21, with the outer screw thread 16 of the body drive member 1 engaging with the inner screw thread 216 of the first tubular portion 21, until the first tubular portion 21 abuts the disk 5. The first end of the body drive member 1 is inserted through the chamber 224 of the second tubular portion 22 and the hole 33 of the locating member 3. The disk 4 is secured on the first end of the body drive member 1 at the slot 14. The protrusions 221 of the second tubular portion 22 are received in the grooves 214 of the first tubular portion 21. The pins 24 are secured in the pinholes 215, 222, so that the first tubular portion 21 and the second tubular portion 22 are fixed together. One end of the locating member 3 abuts the disk 4. The opposite end of the locating member 3 abuts the second tubular portion 22, with the slope 310 of the projection 31 of the locating member 3 in slidable contact with the slope 2230 of the projection 223 of the second tubular portion 22. The hinge assembly is thus completely assembled, as shown in FIG. 4.

In an alternative assembly procedure, the first tubular portion 21 and the second tubular portion 22 are fixed together by means of the pins 24 at an earlier stage in the assembly process. The disk 5 is secured on the second end of the body drive member 1 at the slot 15. The first end of the body drive member 1 is inserted into the cavity 212 of the first tubular portion 21. The body drive member 1 is rotated along through the cavity 212 so that the first end of the body drive member 1 passes through the chamber 224 of the second tubular portion 22 and the hole 33 of the locating member 3. This rotation continues until the disk 5 abuts the first tubular portion 21, at which time the first end of the body drive member 1 is exposed beyond the locating member 3. The disk 4 is secured on the first end of the body drive member 1 at the slot 14.

Figure 5:
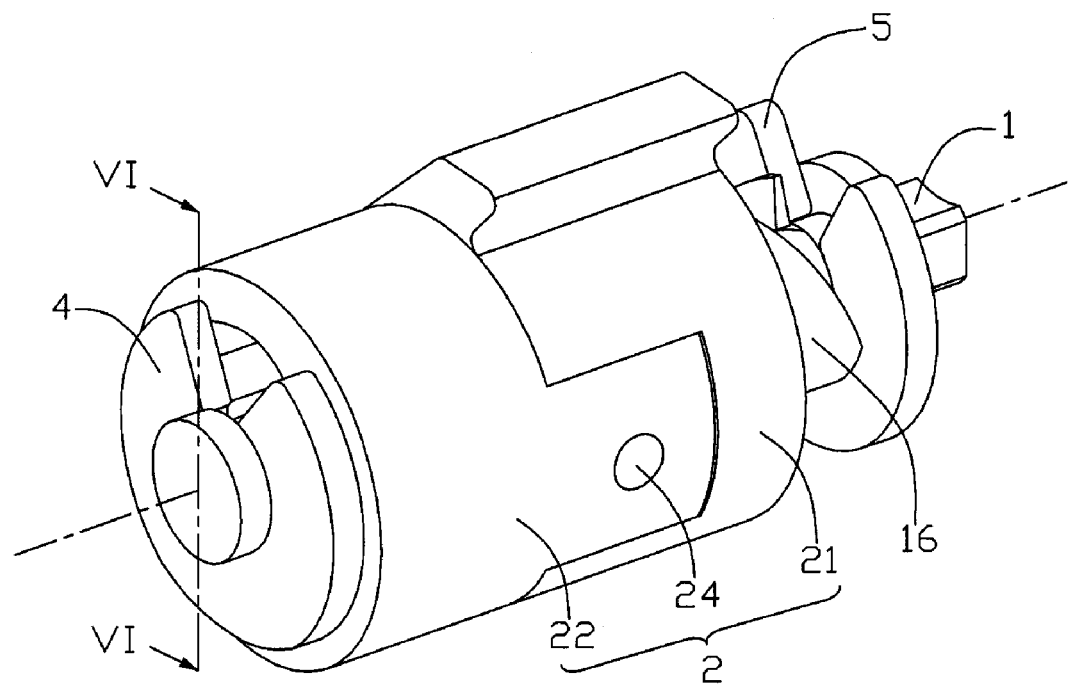
FIG. 5 is similar to FIG. 3, but showing the hinge assembly positioned corresponding to an open position of the foldable electronic device.
Figure 6:
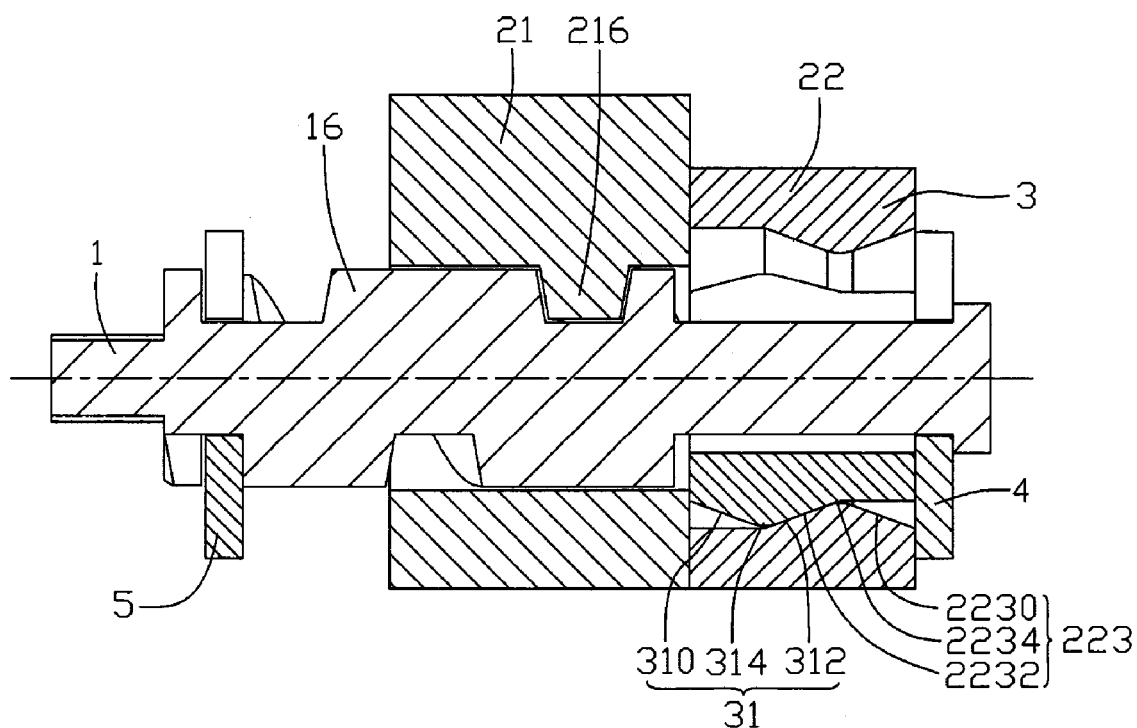
FIG. 6 is a cross-sectional view taken along line VI—VI of FIG. 5.

Referring to FIGS. 3–6, when the slope 310 of the projection 31 of the locating member 3 abuts against the slope 2230 of the projection 223 of the second tubular portion 22, the cover of the foldable electronic device is held in a fully closed position. To open the foldable electronic device, the cover is manually rotated up from the body. Hence the cover drive member 2 is rotated about the body drive member 1. With the engagement of the outer screw thread 16 of the body drive member 1 and the inner screw thread 216 of the first tubular portion 21 of the cover drive member 2, the cover drive member 2 is thereby axially moved away from the disk 5. In this process, the slope 2230 of the projection 223 rides along the slope 310 of the projection 31, and the locating member 3 is compressed. When the ridge 2234 of the projection 223 rides over the ridge 314 of the projection 31, the locating member 3 decompresses and drives the second tubular portion 22 to move axially, with the slope 2232 of the projection 223 riding along the slope 312 of the projection 31. Hence the cover drive member 2 continues to rotate in the opening direction. The cover is thus opened automatically to a fully open position at which the second tubular portion 22 abuts the disk 4, as shown in FIG. 5.

To close the foldable electronic device, the cover is manually rotated down toward the body. Hence the cover drive member 2 is rotated about the body drive member 1. With the engagement of the outer screw thread 16 and the inner screw thread 216, the cover drive member 2 is thereby axially moved away from the disk 4. As a result, the slope 2232 rides along the slope 312, and the locating member 3 is compressed. When the ridge 2234 rides over the ridge 314, the locating member 3 decompresses and drives the second tubular portion 22 to move axially, with the slope 2230 of the projection 223 riding along the slope 310 of the projection 31. Hence the cover drive member 2 continues to rotate in the closing direction. The cover is thus closed automatically to the fully closed position at which the first tubular portion 21 abuts the disk 5, as shown in FIG. 3.

During the processes of the cover automatically opening or closing, the cover drive member 2 and hence the cover are subjected to the decompression force produced by the compressed locating member 3. The slope 2232/2230 of the projection 223 is in slidable contact with the corresponding slope 312/310 of the projection 31, which produces an amount of friction between the cover drive member 2 and the locating member 3. This limits the speed of opening and closing of the cover, so that the cover is protected from damage.

Figure 7:
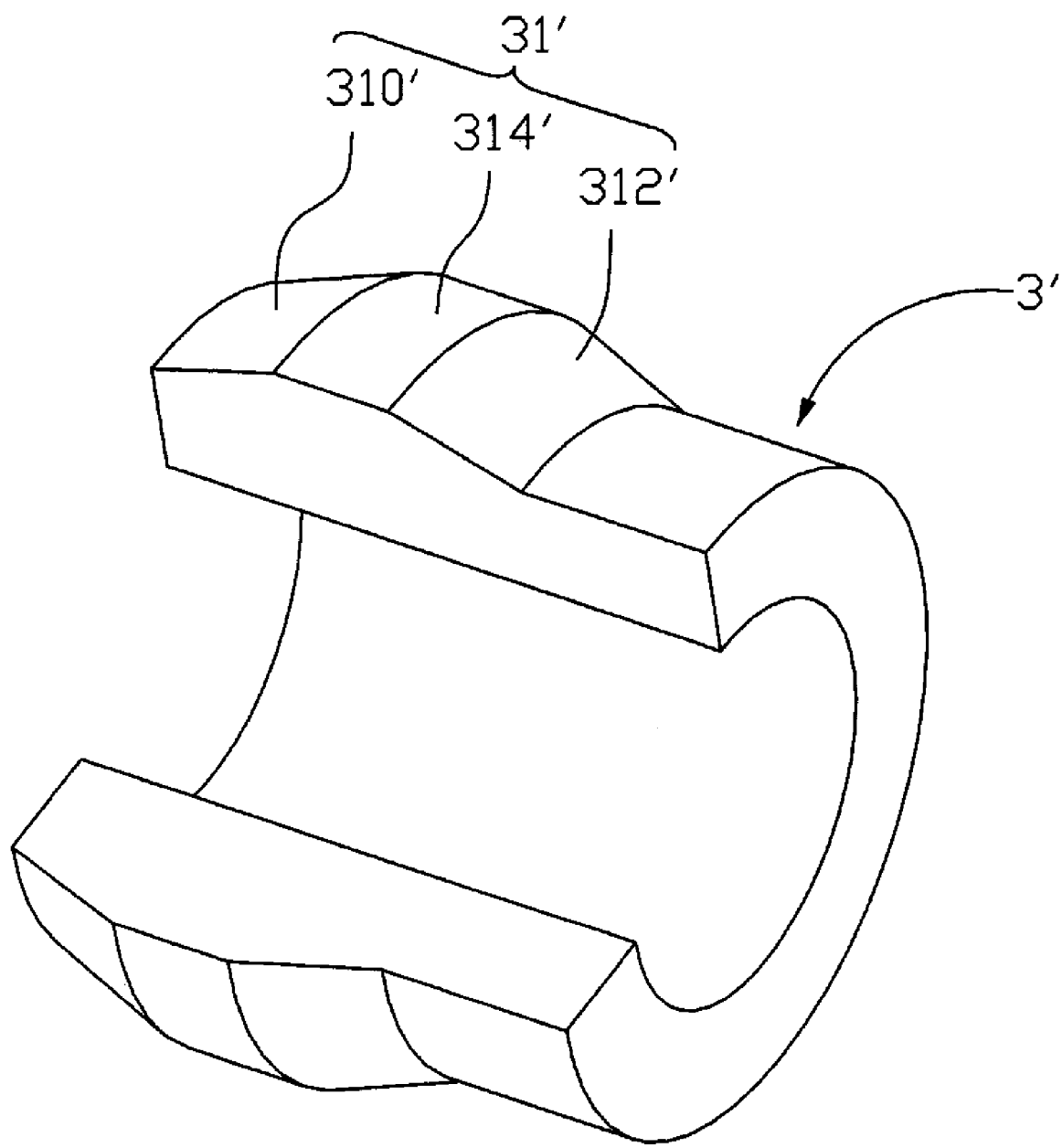
FIG. 7 is an enlarged, isometric view of a locating member according to an alternative embodiment of the present invention.
Figure 8:
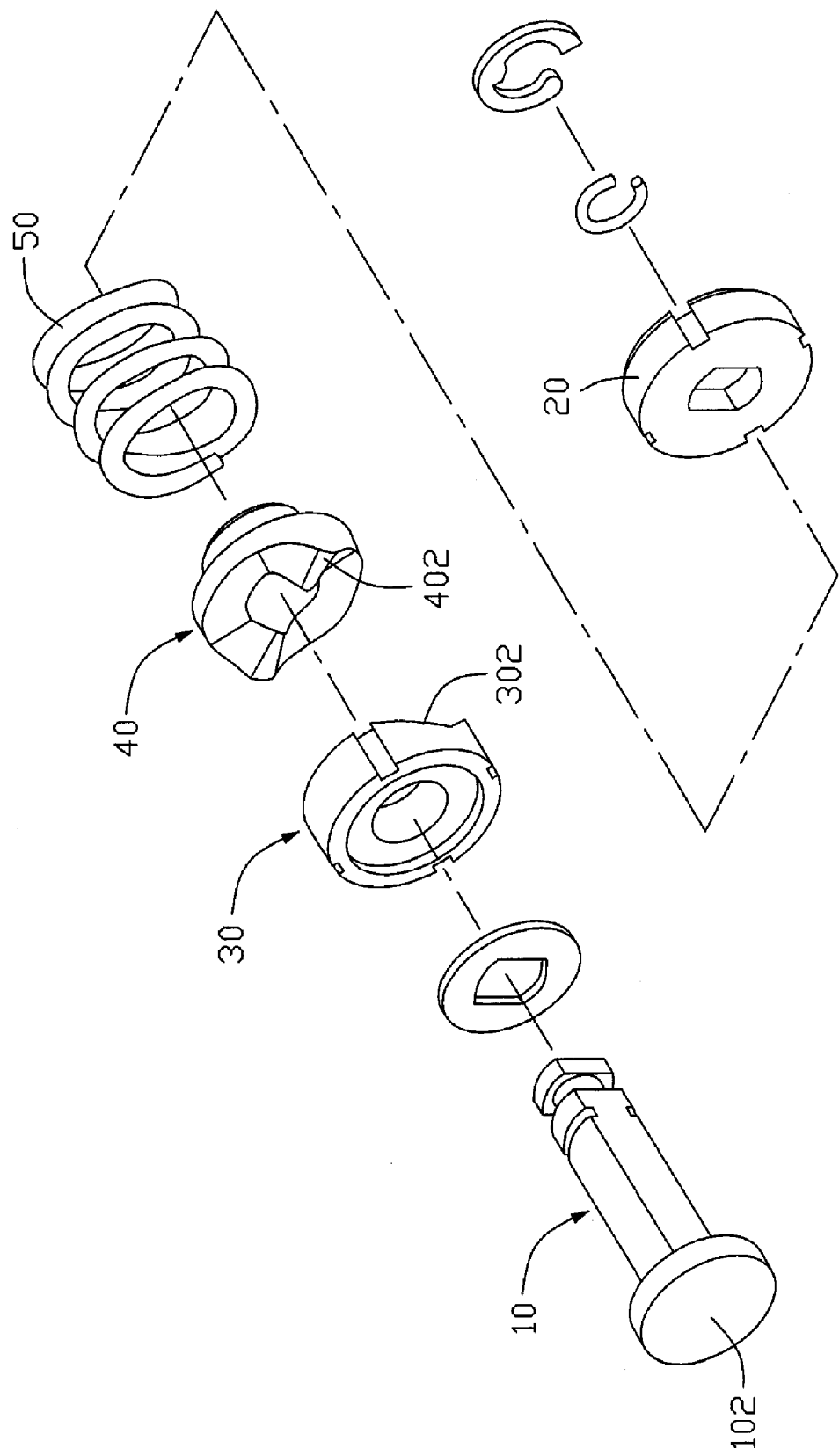
FIG. 8 is an exploded, isometric view of a conventional hinge assembly.

Referring to FIG. 7, a locating member 3' in accordance with an alternative embodiment of the present invention comprises a projection 31'. The projection 31' has two slopes 310', 312' at opposite sides of a ridge 314'. The ridge 314' has a flat surface. During rotation of the cover of the foldable electronic device, when the ridge 2234 of the projection 223 reaches the ridge 314' of the projection 31', the flat surface of the ridge 314' enables the projection 223 to remain stably in position. That is, the cover drive member 2 can remain stable relative to the locating member 3 at a plurality of positions at which the ridge 2234 is in contact with the ridge 314'. Accordingly, the cover drive member 2 can be stably held relative to the body drive member 1 at a plurality of positions. This means that the cover can be located at any of a plurality of partly open positions. Further or alternatively, in similar fashion, the ridge 2234 of the projection 223 may have a flat surface.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for a foldable electronic device, comprising:
   a body drive member, having an outer screw thread on an outer periphery thereof;
   a cover drive member having a central cavity, and a projection and an inner screw thread formed in the cavity; and
   a locating member having a projection formed on an outer periphery thereof, and a central hole;
   wherein the body drive member extends through the cavity of the cover drive member and the hole of the locating member, thereby integrating the hinge assembly into a complete unit, the outer screw thread of the body drive member engaging with the inner screw thread of the cover drive member for guiding rotation of the cover drive member relative to the body drive member, and the projection of the cover drive member movably engaging with the projection of the locating member so as to control the rotation of the cover drive member relative to the body drive member.

2. The hinge assembly as claimed in claim 1, wherein the body drive member is a shaft essentially in the form of a round rod.

3. The hinge assembly as claimed in claim 2, wherein an enlarged head is formed at a first end of the body drive member.

4. The hinge assembly as claimed in claim 3, wherein a lock member is formed at an opposite second end of the body drive member.

5. The hinge assembly as claimed in claim 4, wherein the lock member is substantially cuboid.

6. The hinge assembly as claimed in claim 1, wherein the cover drive member comprises a first tubular portion, a second tubular portion and at least one pin, and said pin fixes the two tubular portions together.

7. The hinge assembly as claimed in claim 6, wherein the first tubular portion is in the form of a hollow cylinder, and comprises a tubular body and a central cavity.

8. The hinge assembly as claimed in claim 7, wherein at least one groove is defined in a circumferential periphery of the body of the first tubular portion.

9. The hinge assembly as claimed in claim 8, wherein the body of the first tubular portion defines a pinhole therethrough below said groove and in communication with said groove.

10. The hinge assembly as claimed in claim 9, wherein the second tubular portion is in the form of a hollow cylinder, and comprises a tubular body and a central chamber.

11. The hinge assembly as claimed in claim 10, wherein at least one protrusion extends from an end of the body of the second tubular portion, and said protrusion is adapted to be received in said groove of the first tubular portion.

12. The hinge assembly as claimed in claim 11, wherein said protrusion of the second tubular portion defines a pinhole therethrough, and the pinhole of the second tubular portion is aligned with the pinhole of the first tubular portion.

13. The hinge assembly as claimed in claim 1, wherein the locating member axially defines a cutout therethrough in communication with the hole of the locating member.

14. The hinge assembly as claimed in claim 1, wherein a ridge of the projection of the locating member has a flat surface.

15. The hinge assembly as claimed in claim 1, wherein a ridge of the projection of the cover drive member has a flat surface.

16. A foldable electronic device comprising:
   a body;
   a cover, and
   a hinge assembly hingedly interconnecting the body and the cover, the hinge assembly comprising:
   a body drive member, having an outer screw thread on an outer periphery thereof;
   a cover drive member having a central cavity, and a projection and an inner screw thread formed in the cavity; and
   a locating member having a projection on an outer periphery thereof, and a central hole;
   wherein the body drive member extends through the cavity of the cover drive member and the hole of the locating member, thereby integrating the hinge assembly into a complete unit, the outer screw thread of the body drive member threadingly engaging with the inner screw thread of the cover drive member for guiding rotation of the cover drive member relative to the body drive member, and the projection of the cover drive member movably engaging with the projection of the locating member so as to control the rotation of the cover drive member relative to the body drive member.

17. The foldable electronic device as claimed in claim 16, wherein the body drive member comprises a lock member engaged with the body, so that the body drive member is rotatable with the body.

18. The foldable electronic device as claimed in claim 16, wherein the cover drive member comprises a lock member engaged with the cover, so that the cover drive member is rotatable with the cover.

19. The foldable electronic device as claimed in claim 16, wherein a ridge of the projection of the locating member has a flat surface.

20. The foldable electronic device as claimed in claim 16, wherein a ridge of the projection of the cover drive member has a flat surface.

* * * * *